(12) United States Patent
Lyver et al.

(10) Patent No.: US 12,397,905 B1
(45) Date of Patent: Aug. 26, 2025

(54) LOCKING SYSTEM FOR AIRCRAFT LANDING GEAR BAY DOORS

(71) Applicant: American Honda Motor Co., Inc., Torrance, CA (US)

(72) Inventors: Peter Lyver, Greensboro, NC (US); Paul Stephen Banks, Winston Salem, NC (US); Marc Richard Lambert, Reidsville, NC (US)

(73) Assignee: AMERICAN HONDA MOTOR CO., INC., Torrance, CA (US)

( * ) Notice: Subject to any disclaimer, the term of this patent is extended or adjusted under 35 U.S.C. 154(b) by 0 days.

(21) Appl. No.: 18/751,694

(22) Filed: Jun. 24, 2024

(51) Int. Cl.
*B64C 25/16* (2006.01)
*B64C 25/26* (2006.01)

(52) U.S. Cl.
CPC .............. *B64C 25/16* (2013.01); *B64C 25/26* (2013.01)

(58) Field of Classification Search
CPC ......... B64C 25/16; B64C 25/26; B64C 25/20; B64C 25/28; B64C 25/30; B64C 25/10; B64D 1/06; E05C 7/00; E05C 7/04; E05C 7/06; E05B 63/0052; E05F 17/004; E05F 2017/008; E06B 3/362
See application file for complete search history.

(56) References Cited

U.S. PATENT DOCUMENTS

| | | | |
|---|---|---|---|
| 5,035,449 A * | 7/1991 | Shiratori | E05C 7/06 292/DIG. 43 |
| 7,243,880 B2 * | 7/2007 | White | B64C 25/16 244/129.4 |
| 7,287,726 B2 | 10/2007 | Briancourt | |
| 7,707,924 B2 | 5/2010 | Yamanouchi et al. | |
| 7,959,195 B2 * | 6/2011 | Harvey | E05B 63/0069 292/DIG. 60 |
| 9,499,258 B2 * | 11/2016 | Reynes | B64C 25/16 |
| 10,654,562 B2 | 5/2020 | Wilson et al. | |
| 10,974,819 B2 | 4/2021 | Luce | |
| 11,208,195 B2 | 12/2021 | Tsai et al. | |
| 11,377,205 B2 | 7/2022 | Woolcock et al. | |
| 11,753,149 B2 | 9/2023 | Webb | |
| 11,827,342 B2 | 11/2023 | Dahl et al. | |
| 11,919,624 B2 | 3/2024 | Schmidt | |
| 12,157,558 B2 * | 12/2024 | Dufay | E05B 81/68 |
| 2005/0230549 A1 * | 10/2005 | White | B64C 25/16 244/129.4 |
| 2008/0203739 A1 * | 8/2008 | Lim | E05C 19/04 292/340 |
| 2013/0075527 A1 * | 3/2013 | Lecourtier | B64C 25/28 244/129.5 |
| 2015/0069178 A1 | 3/2015 | Brown et al. | |
| 2024/0132204 A1 * | 4/2024 | Dufay | B64D 1/06 |

FOREIGN PATENT DOCUMENTS

CN 118933462 A * 11/2024

* cited by examiner

*Primary Examiner* — Arfan Y. Sinaki
(74) *Attorney, Agent, or Firm* — Plumsea Law Group, LLC

(57) ABSTRACT

A locking system for doors of a deployable aircraft landing gear system includes a spring-biased swing arm configured to be pivotally attached to a body of an aircraft and including a roller at a distal end of the swing arm. The swing arm is configured to engage with a portion of a first landing gear bay door to prevent the first landing gear bay door from opening.

13 Claims, 15 Drawing Sheets

LOCKING SYSTEM FOR AIRCRAFT LANDING GEAR BAY DOORS

BACKGROUND

1. Field of the Disclosure

The present disclosure relates to a locking system for aircraft landing gear bay doors and, more particularly, to a locking system including a spring-biased swing arm.

2. Description of Related Art

Many types of aircraft include deployable/retractable landing gear. Such landing gear is stowed within the body of the aircraft (i.e., within the fuselage or within the aircraft's wings) during flight. During takeoff and landing and when the aircraft is on the ground, the landing gear is deployed outside the body of the aircraft. When the landing gear is stowed, it is closed within a landing gear bay behind (actually above) one or more landing gear bay doors. During flight, the air flowing around the aircraft results in suction applied to the landing gear bay doors. This suction can overload the actuators that open and close the bay doors.

In some cases, the bay doors for a particular landing gear system may be similarly sized. Such doors do not need to be opened very far in order to allow deployment of the landing gear. However, in other cases, bay doors for a particular landing gear system may be of different sizes. That is, a single landing gear assembly may be concealed by two adjacent doors that are different sizes from one another. For example, for landing gear under a wing, there may be an inboard landing gear bay door that is relatively smaller, and an outboard landing gear bay door that is relatively larger. The landing gear may be hingedly attached in the same manner as the outboard door, that is, the door opens in an outboard direction and the landing gear deploys in the same direction.

In order to open a larger landing gear bay door (e.g., the outboard door in the example mentioned above) far enough to provide clearance for the landing gear to be deployed, the door actuator may be affixed to the bay door relatively close to the hinge line of the door. This maximizes the extent to which the door may be opened, but reduces the mechanical advantage of the door actuator in its association with the door. Because of this reduced mechanical advantage, the outboard door actuator may not secure the outboard door particularly well against the suction forces on the door during flight. In addition, the larger the door, the greater the surface area, the more suction force applied against the door overall. And, because the inboard door overlaps the outboard door, the slight opening of the outboard door due to suction during flight results in the outboard door pushing the inboard door outward. This can overload the actuator of the inboard door.

There is a need in the art for a locking system for landing gear bay doors that addresses one or more of the issues noted above.

SUMMARY OF THE INVENTION

The present disclosure directed to a locking system (i.e., an "uplock" assembly) including a spring-biased swing arm. The system includes a hook-shaped fitting on the outboard landing gear bay door. The spring-biased swing arm is biased in a manner such that the swing arm secures a roller at the end of the swing arm under the hook of the hooked shaped fitting, thereby preventing the outboard door from being drawn outward by suction forces during flight. This prevents the outboard door from exerting force on the overlapping inboard door and overloading the inboard door actuator.

The locking system may be implemented on any aircraft that utilizes deployable landing gear (i.e., retractable landing gear), including fixed wing aircraft, as well as helicopters, drones, etc. Also, although the disclosed uplock system is discussed in the context of an assembly with unevenly sized doors, the system could be implemented with substantially evenly sized doors.

Again, in flight, suction loads on the outboard door can be particularly high, which pulls the outboard door outward (downward) to some extent, thereby pushing outward against the overlapping (underlapping actually) inboard door, overloading the actuator that drives the inboard door. The disclosed uplock system is configured to secure the outboard door. When the outboard door is sucked outward, it moves downward slightly and the camming action of the outboard door fitting pushes the roller of the swing arm inboard against the inboard door fitting, which serves as a stop. Since the roller is stopped, it cannot move out of the way of the outboard door fitting hook and the roller keeps the outboard door from moving out any further.

In one aspect, the present disclosure is directed to a locking system for doors of a deployable aircraft landing gear system, the locking system comprising a spring-biased swing arm configured to be pivotally attached to a body of an aircraft and including a roller at a distal end of the swing arm. The swing arm is configured to engage with a portion of a first landing gear bay door to prevent the first landing gear bay door from opening.

In another aspect, the present disclosure is directed to an aircraft including a body and at least one set of deployable landing gear configured to be retracted into a landing gear bay within the body of the aircraft. The aircraft further includes a first landing gear bay door and a second landing gear bay door adjacent to the first landing gear bay door. In addition, the aircraft includes a locking system including a spring-biased swing arm pivotally attached to the body of the aircraft and including a roller at a distal end of the swing arm. The swing arm is configured to engage with a portion of the first landing gear bay door to prevent the first landing gear bay door from opening.

In another aspect, the present disclosure is directed to a locking system for doors of a deployable aircraft landing gear system. The locking system includes a first landing gear bay door and a second landing gear bay door adjacent to the first landing gear bay door. The locking system further includes a spring-biased swing arm configured to be pivotally attached to the body of the aircraft and including a roller at a distal end of the swing arm, wherein the swing arm is configured to engage with a portion of the first landing gear bay door to prevent the first landing gear bay door from opening.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to some aspects, the present disclosure is directed to a landing gear bay door locking system (i.e., an "uplock" assembly) including a spring-biased swing arm.

Figure 1:
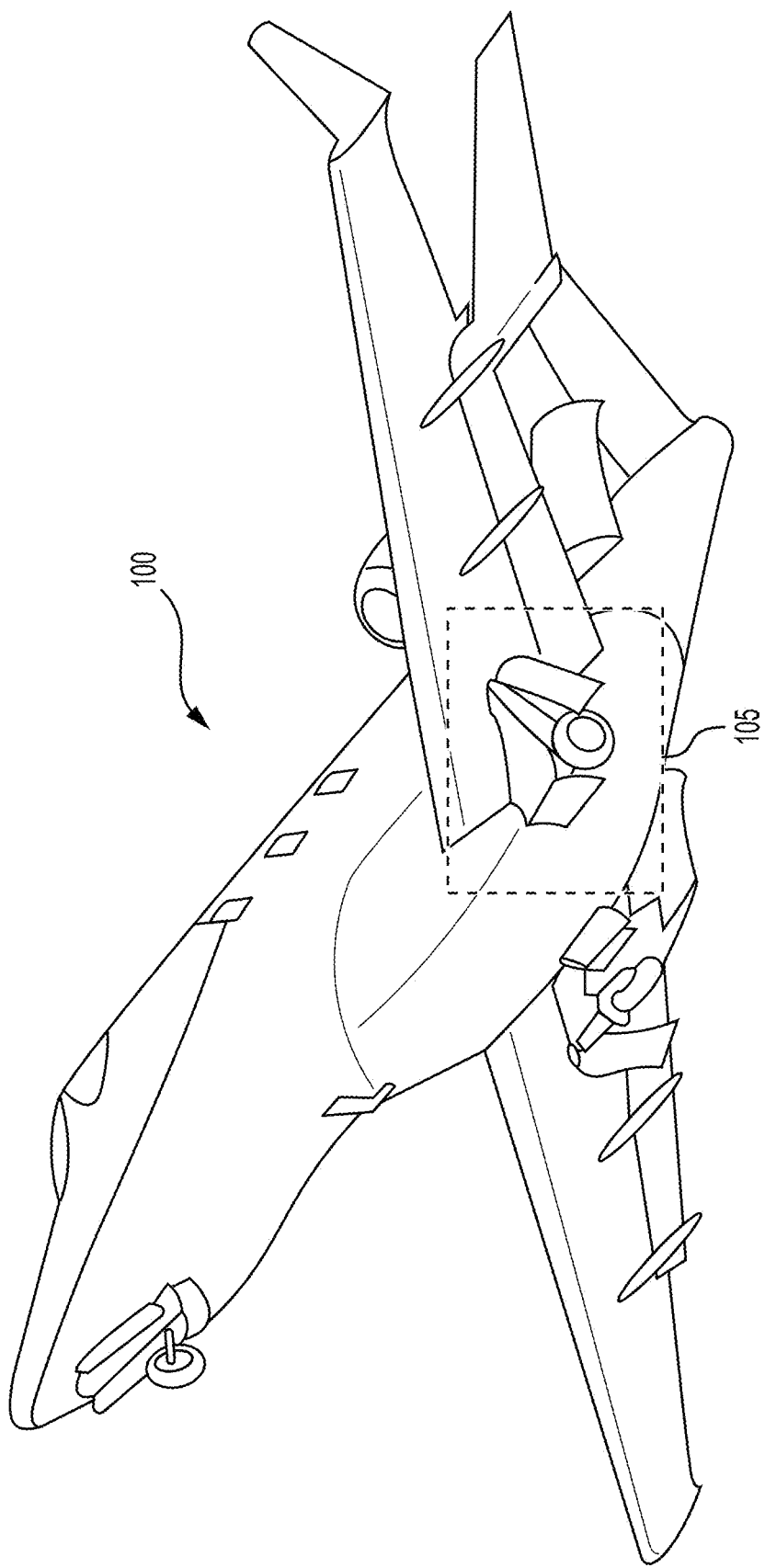
FIG. 1 is a schematic perspective underside view of an aircraft with deployable/retractable landing gear.

FIG. 1 is a schematic perspective underside view of an aircraft with deployable/retractable landing gear. As shown in FIG. 1, an aircraft 100 may include one or more sets of deployable/retractable landing gear 105. As shown in FIG. 1, the aircraft may include multiple sets of deployable/retractable landing gear. It is common to have a set of deployable/retractable landing gear on the nose of the aircraft and two on the wings, as shown in FIG. 1. In larger aircraft, more than three sets of deployable/retractable landing gear may be utilized. Also, a fixed wing aircraft is shown in FIG. 1. However, it will be understood that other types of aircraft may also have deployable/retractable landing gear and, therefore, the disclosed locking system may be implemented on other types of aircraft, such as helicopters, drones, etc.

Figure 2:
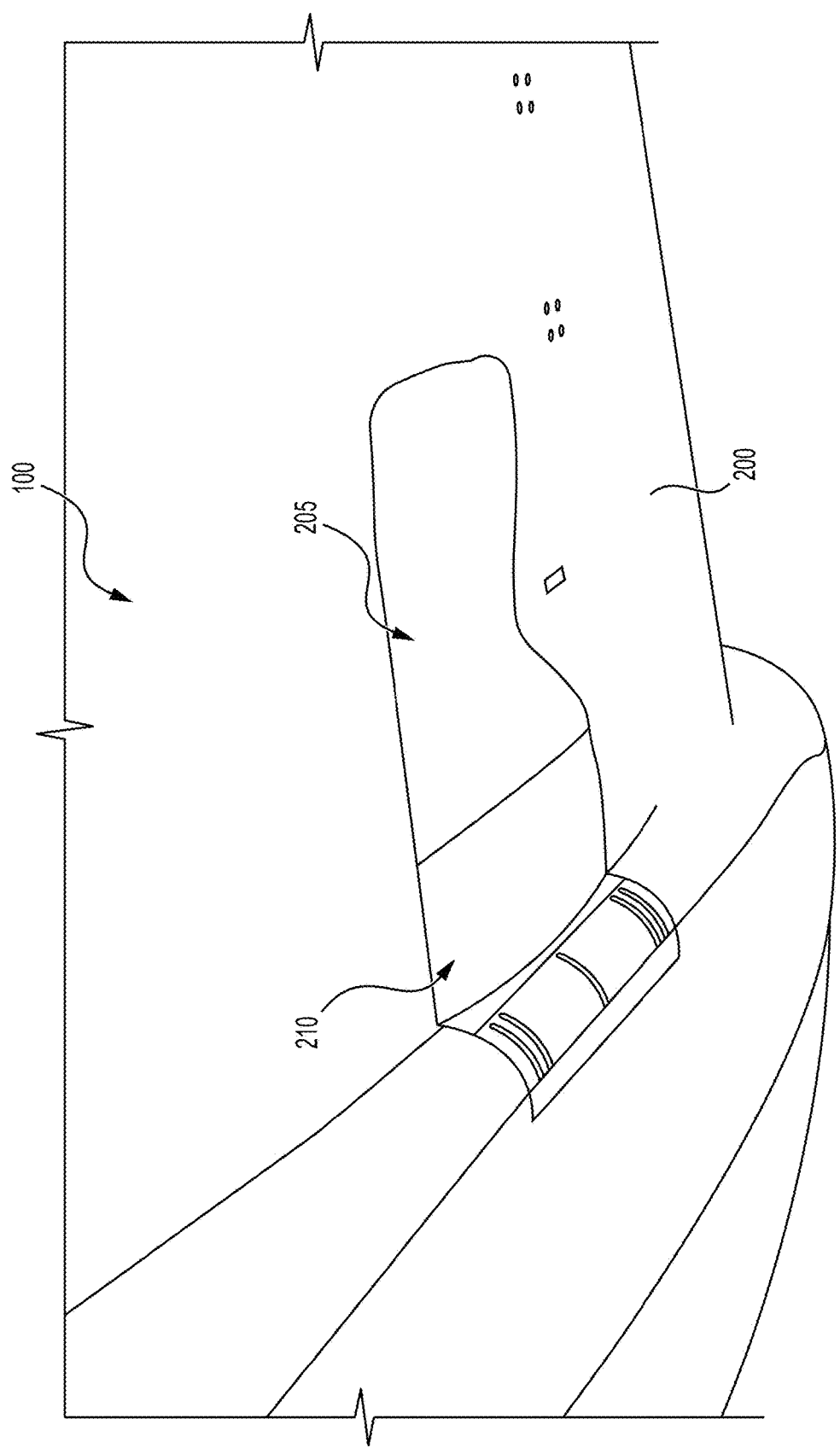
FIG. 2 is a schematic perspective underside view of landing gear bay doors of an aircraft.

FIG. 2 is a schematic perspective underside view of landing gear bay doors of an aircraft. As shown in FIG. 2, aircraft 100 may include a body 200, which may include the fuselage, wings, etc. In addition, aircraft 100 may include a first landing gear bay door 205. In this configuration, first door 205 is an outboard door (i.e., positioned away from the longitudinally-oriented centerline of the aircraft. Further, aircraft 100 may include a second landing gear bay door 210. In this configuration second door 210 is an inboard door, i.e., closer to the longitudinally-oriented centerline of the aircraft.

Figure 3:
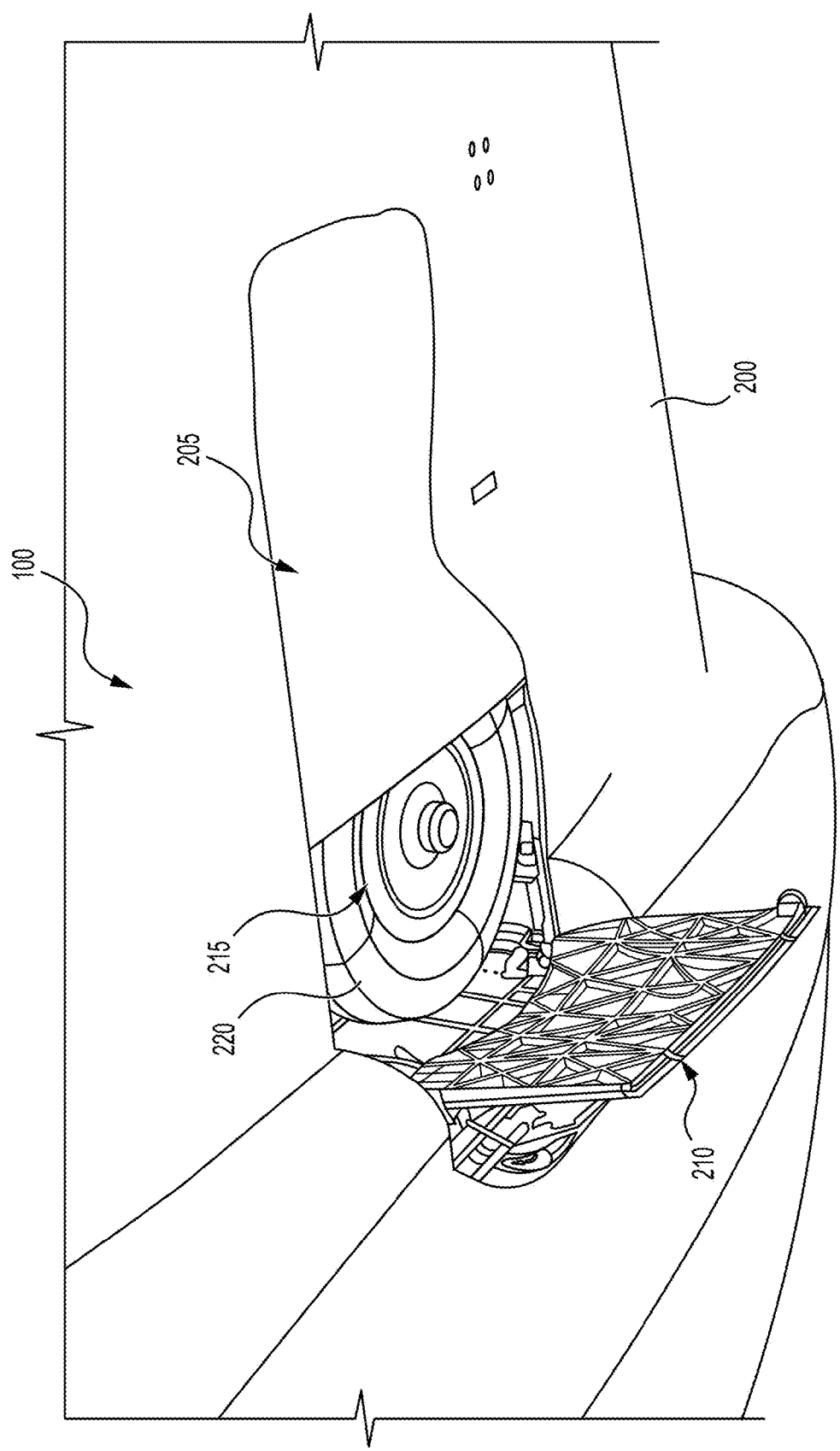
FIG. 3 is a schematic perspective underside view of the aircraft of FIG. 3, with an inboard landing gear bay door open.

FIG. 3 is a schematic perspective underside view of the aircraft of FIG. 3, with an inboard landing gear bay door open. Because second landing gear bay door 210 overlaps first landing gear bay door 205, second landing gear bay door 210 must be opened first, which is shown in FIG. 3. As can be seen in FIG. 3, opened second landing gear bay door exposes the landing gear wheel 215 and tire 220.

Figure 4:
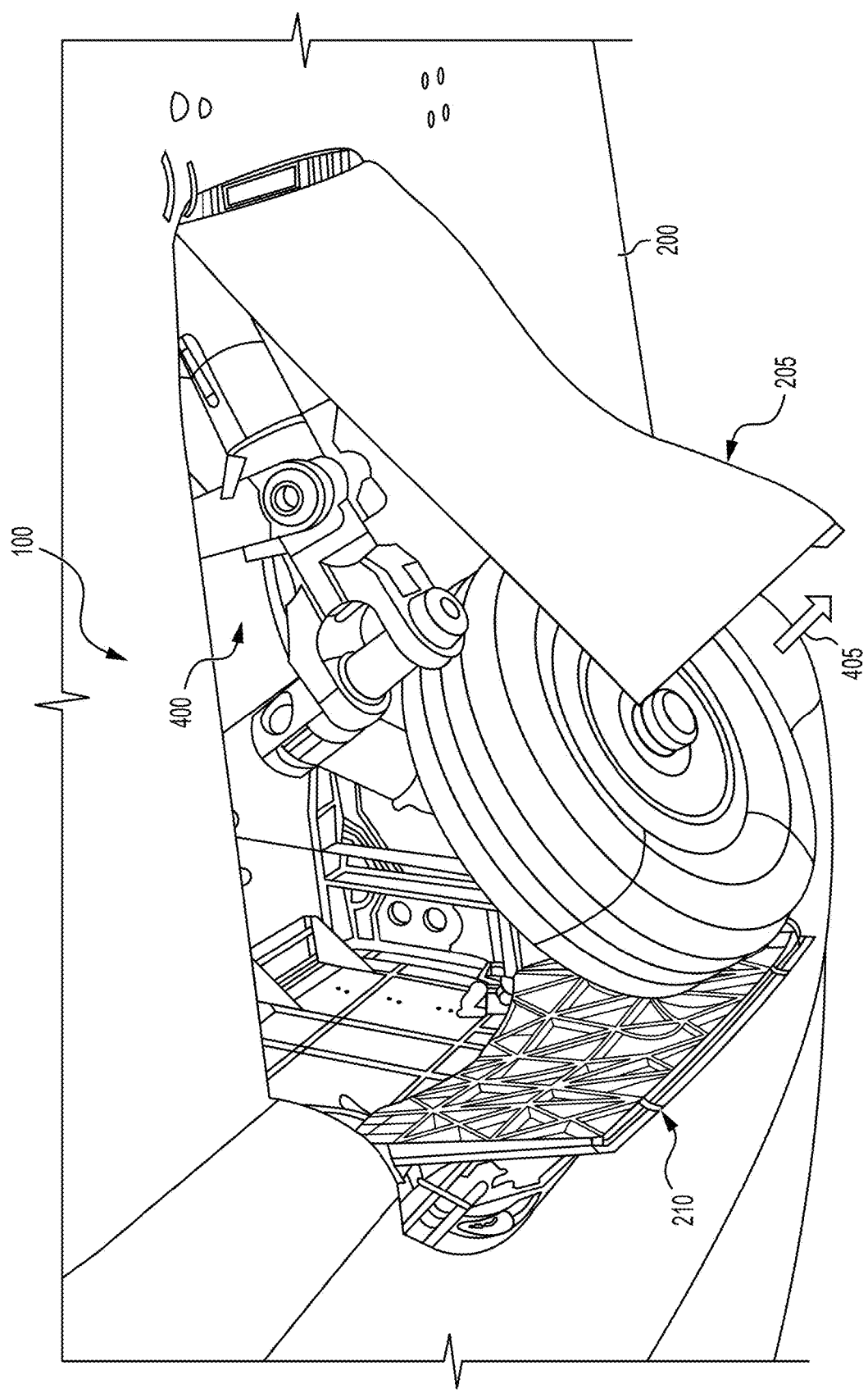
FIG. 4 is a schematic perspective underside view of the aircraft of FIG. 3, with an outboard landing gear bay door partially open and a landing gear assembly partially deployed.

FIG. 4 is a schematic perspective underside view of the aircraft of FIG. 3, with an outboard landing gear bay door partially open and a landing gear assembly partially deployed. As shown in FIG. 4, first landing gear bay door 205 is partially open, and a landing gear assembly 400 is partially deployed. An arrow 405 illustrates the movement of landing gear assembly 400 as it deploys.

Figure 5:
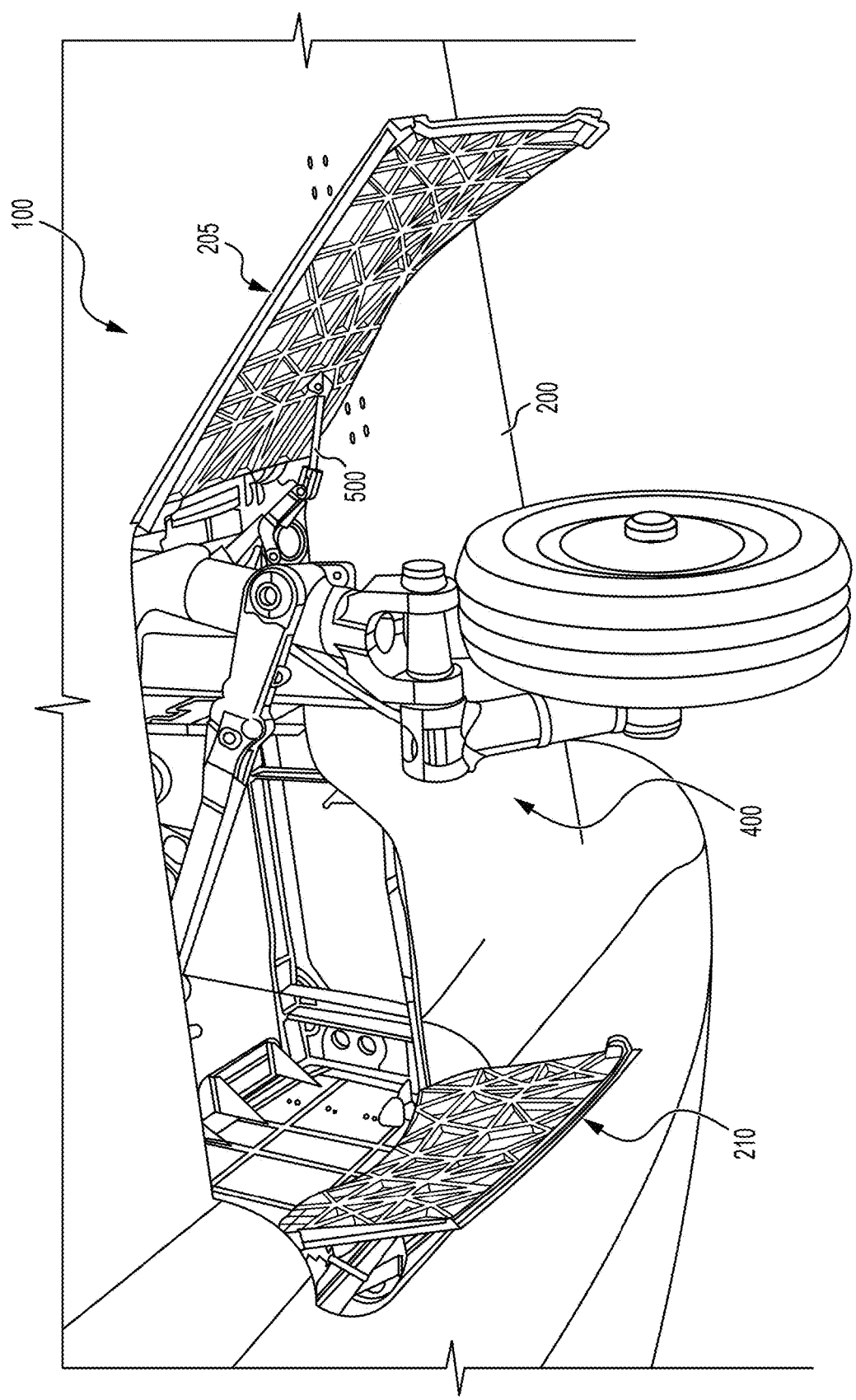
FIG. 5 is a schematic perspective underside view of the aircraft of FIG. 3, with an outboard landing gear bay door fully open and the landing gear assembly fully deployed.

FIG. 5 is a schematic perspective underside view of the aircraft of FIG. 3, with an outboard landing gear bay door fully open and the landing gear assembly fully deployed. As shown in FIG. 5, first landing gear bay door 205 is fully opened, and landing gear assembly 400 is fully deployed. In addition, second landing gear bay door 210 is still open at this point of the deployment process.

Figure 6:
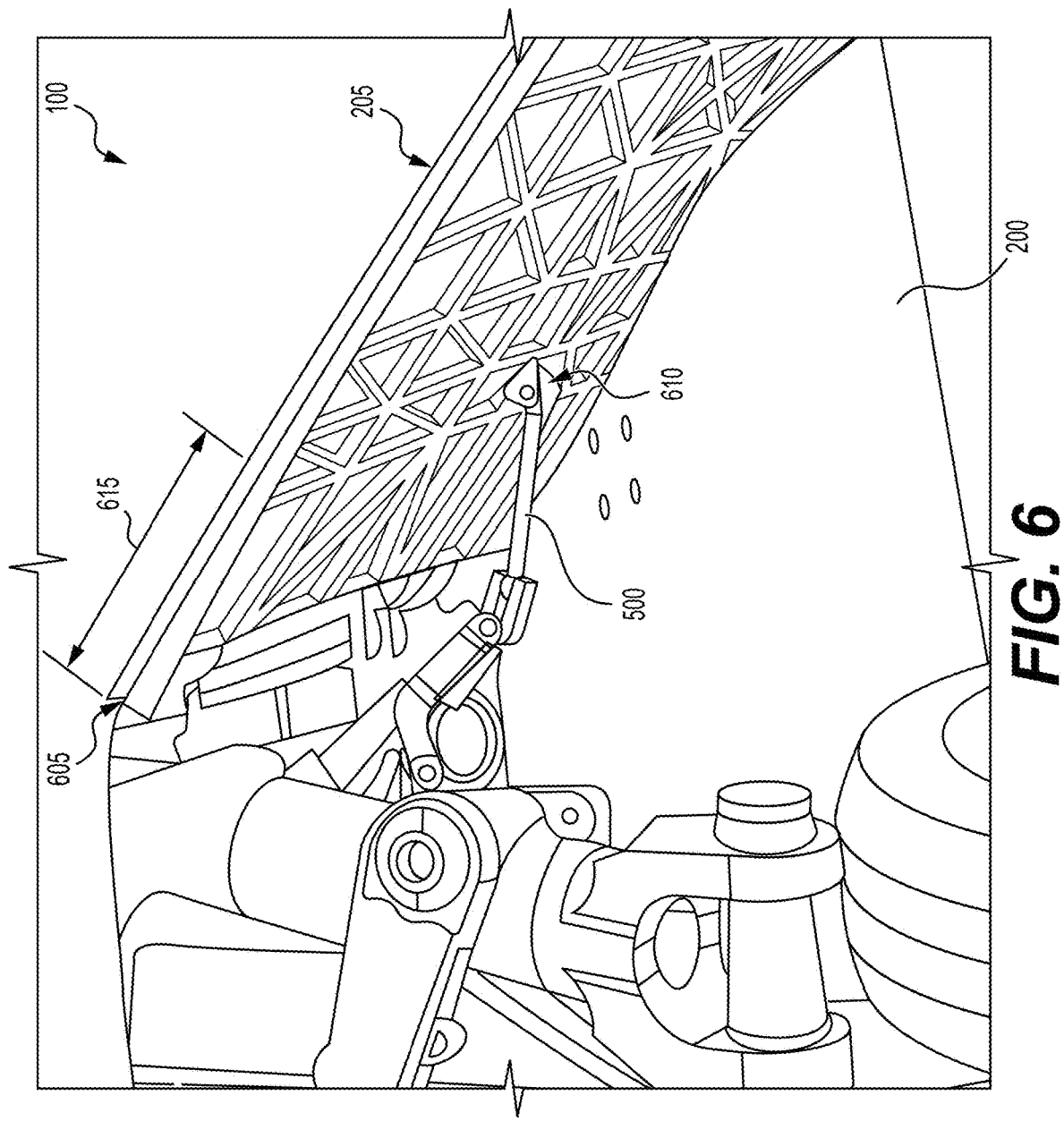
FIG. 6 is a schematic perspective underside view of an actuator assembly for the outboard door.

Also shown in FIG. 5 is an outboard door actuator 500. FIG. 6 is a schematic perspective underside view of the actuator assembly for the outboard door. As shown in FIG. 6, outboard door actuator 500 is attached to first landing gear bay door 205 relatively close to the hingeline of the door. In particular, the hingeline 605 of first landing gear bay door and the anchor point 610 of actuator 500 on door 205 are only separated by a relatively short distance 615. As discussed above, this short distance enables door 205 to be opened quite wide, but reduces mechanical advantage, which in turn reduces resistance to suction forces on door 205 during flight.

Figure 7:
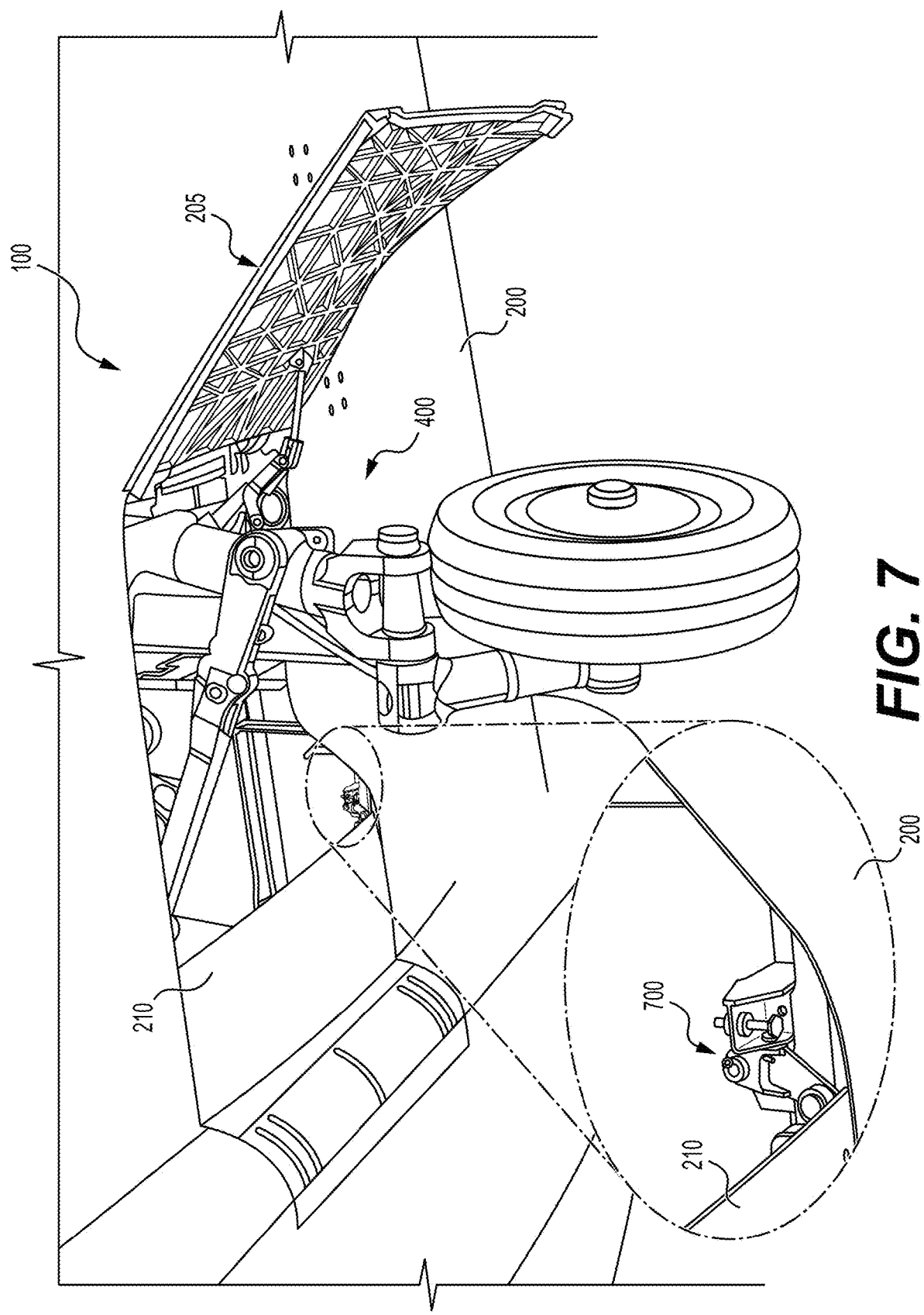
FIG. 7 is a schematic perspective underside view of a deployed landing gear assembly with an enlarged view of an uplock mechanism.

FIG. 7 is a schematic perspective underside view of a deployed landing gear assembly with an enlarged view of an uplock mechanism. As shown in FIG. 7, first landing gear bay door 205 is open, landing gear assembly 400 is deployed, and second landing gear bay door 210 is closed. This is the arrangement of components during takeoff and landing (and of course when the aircraft is on the ground).

FIG. 7 also shows an uplock assembly 700 secured to the body of aircraft 100. As shown in FIG. 7, uplock assembly

700 is positioned proximate the interface between first landing gear bay door 205 and second landing gear bay door 210.

Figure 8:
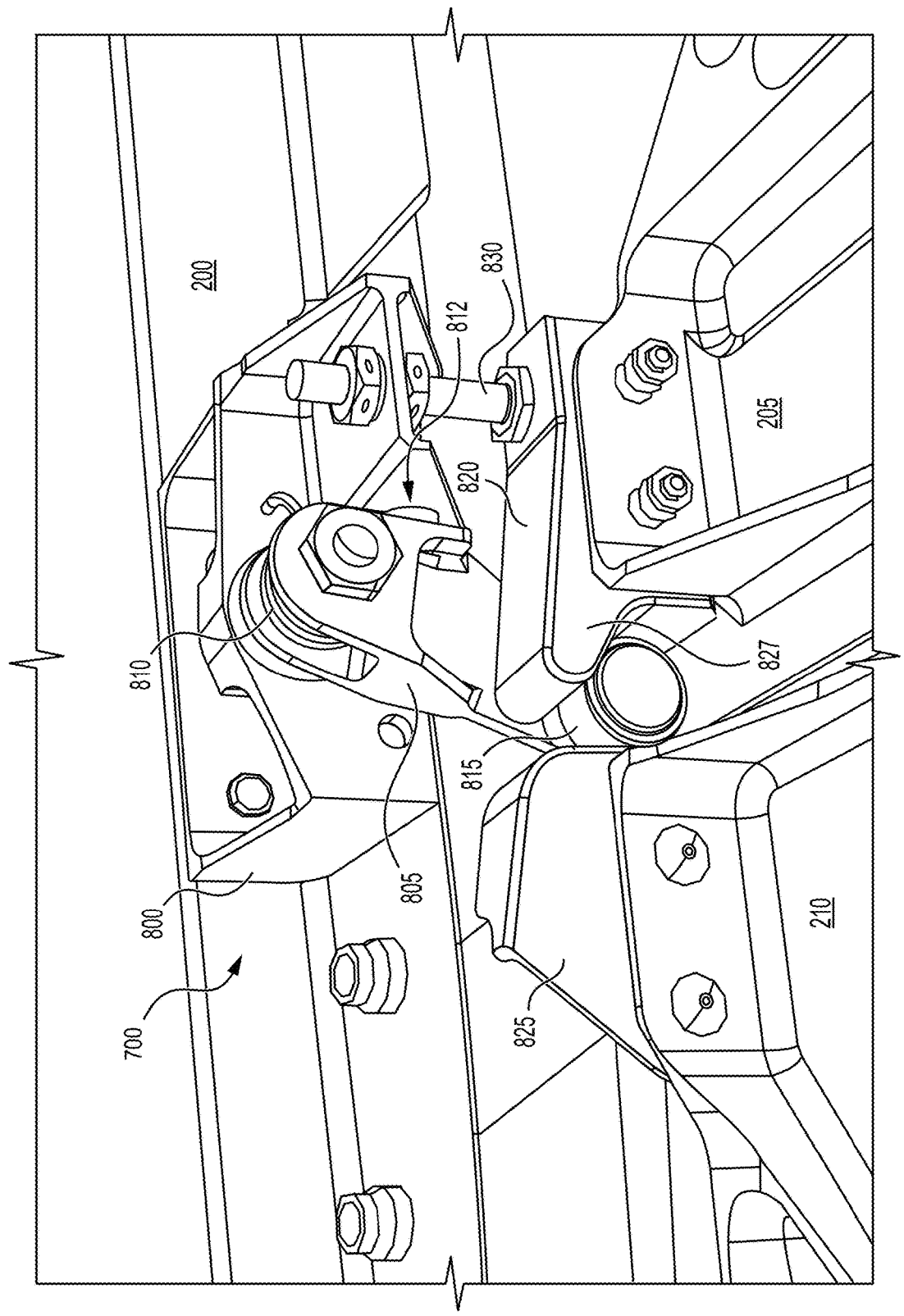
FIG. 8 is a schematic is an enlarged view of the locking system implementing the uplock mechanism identified in FIG. 7, shown in a secured condition with the landing gear fully retracted and both bay doors fully closed.

FIG. 8 is a schematic is an enlarged view of the locking system implementing the uplock mechanism identified in FIG. 7, shown in a secured condition with the landing gear fully retracted (stowed) and both bay doors fully closed. As shown in FIG. 8, the locking system may include uplock assembly 700, which may include a swing arm support bracket 800 secured/attached to body 200 of the aircraft. Uplock assembly 700 may also include a spring-biased swing arm 805 pivotally attached to the body of the aircraft (by virtue of being pivotally attached to swing arm support bracket 800, which is attached to body 200 of the aircraft). Swing arm 805 may be spring-biased by a torsion spring 810. In addition, swing arm 805 may include a roller 815 at a distal end of swing arm 805.

Swing arm 805 is configured to engage with a portion of first landing gear bay door 205 to prevent first landing gear bay door 205 from opening. In particular, first landing gear bay door 205 may include a first door fitting 820 and second landing gear bay door 210 may include a second door fitting 825, wherein first door fitting 820 and second door fitting 825 are configured to interface with roller 815 of swing arm 805. First door fitting 820 includes a hook 827 (or protrusion) and roller 815 is configured to engage first landing gear bay door 205 under hook 827, thereby preventing first landing gear bay door 205 from opening. Further, roller 815 of swing arm 805 is configured to be prevented from disengaging from the portion of first landing gear bay door 205 (i.e., hook 827) by a portion of second landing gear bay door 210 (i.e., second door fitting 825). In particular, roller 815 is configured to abut the portion of second landing gear bay door 210 to prevent roller 815 from moving out from under hook 827 of first door fitting 820 of first landing gear bay door 205.

In addition, uplock assembly 700 may also include an adjustable swing arm stop 812 associated with swing arm support bracket 800. In particular, adjustable swing arm stop 812 may be configured to determine an unrotated position of swing arm 805. That is, adjustable swing arm stop 812 may dictate the position of swing arm 805 when the doors have not moved swing arm 805 against the spring bias.

Uplock assembly 700 may also include an adjustable door stop bolt 830. Door stop bolt 830 may determine the position of first landing gear bay door 205 in the closed position. Swing arm 805 and roller 815 may secure first landing gear bay door 205 against door stop bolt 830.

Figure 9:
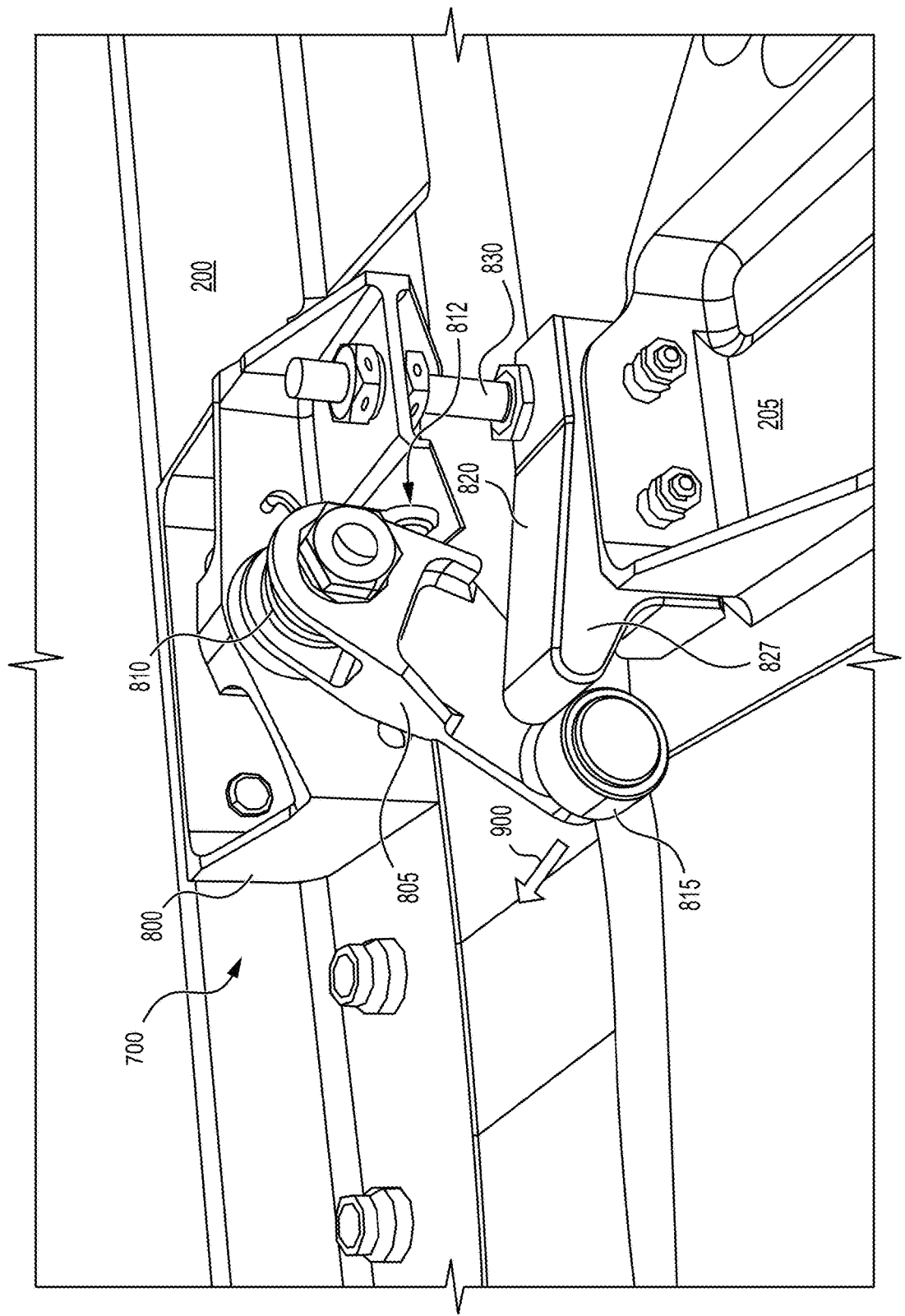
FIG. 9 is a schematic enlarged view of the locking system with the inboard door open, the outboard door beginning to open, and the swing arm rotated in an inboard direction.

FIG. 9 is a schematic enlarged view of the locking system with the inboard door open, the outboard door beginning to open, and the swing arm rotated in an inboard direction. As shown in FIG. 9, with second landing gear bay door 210 opened and second door fitting 825 out of the way, first landing gear bay door 205 can be actuated to open because the camming action of hook 827 will push roller 815 in the inboard direction against the spring bias of torsion spring 810, as illustrated by an arrow 900.

Figure 10:
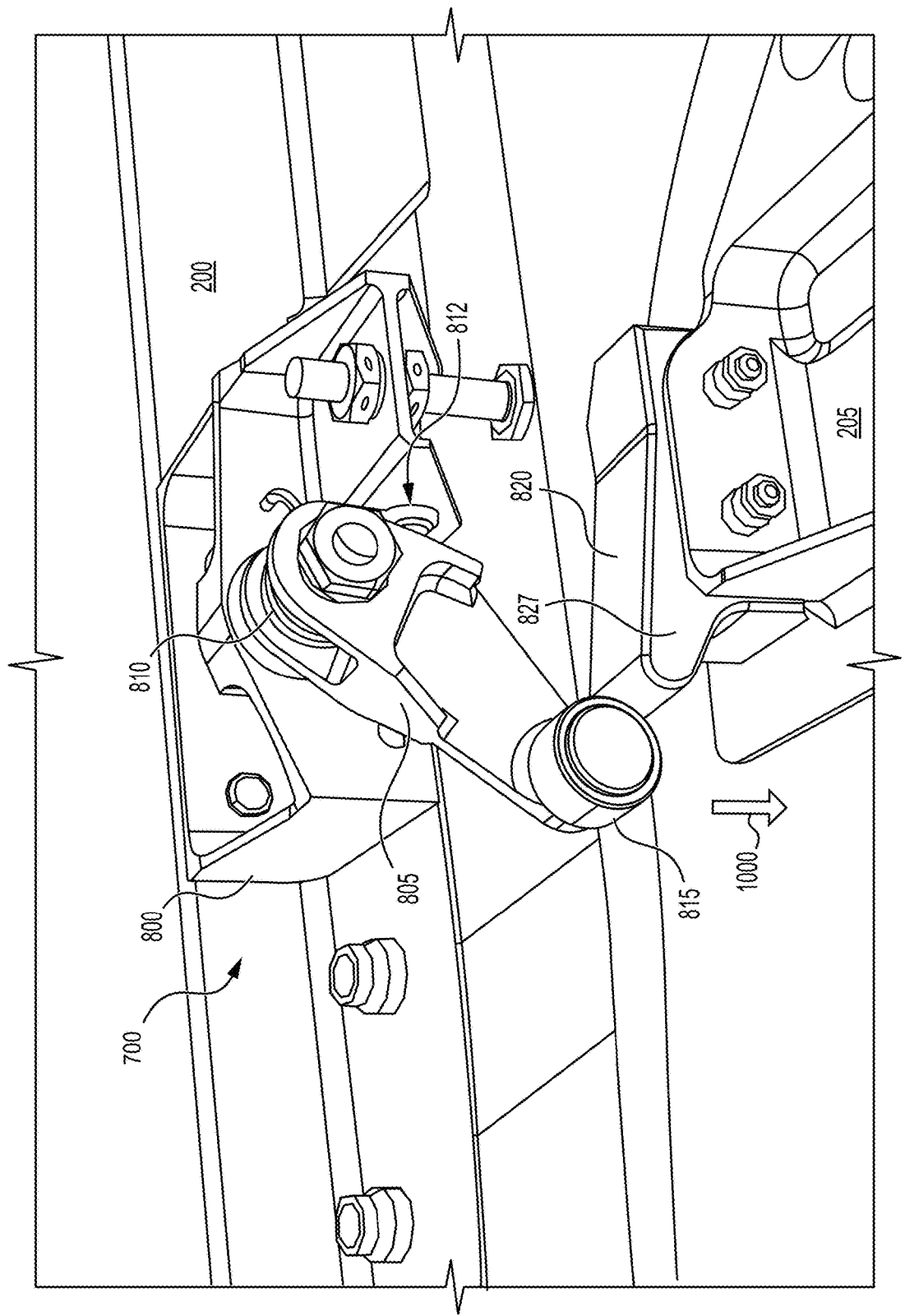
FIG. 10 is a schematic enlarged view of the locking system with the outboard door opened slightly further than shown in FIG. 9, and the roller of the swing arm cammed at maximum rotation of the swing arm with the roller positioned at the tip of the hook (projection) of the outboard door fitting.

FIG. 10 is a schematic enlarged view of the locking system with the outboard door opened slightly further than shown in FIG. 9, and the roller of the swing arm cammed at maximum rotation of the swing arm with the roller positioned at the tip of the hook (projection) of the outboard door fitting. As shown in FIG. 10, first landing gear bay door 205 has opened further in the direction of an arrow 1000. Roller 815 is at maximum rotation as it is pushed inboard at the tip of hook 827.

Figure 11:
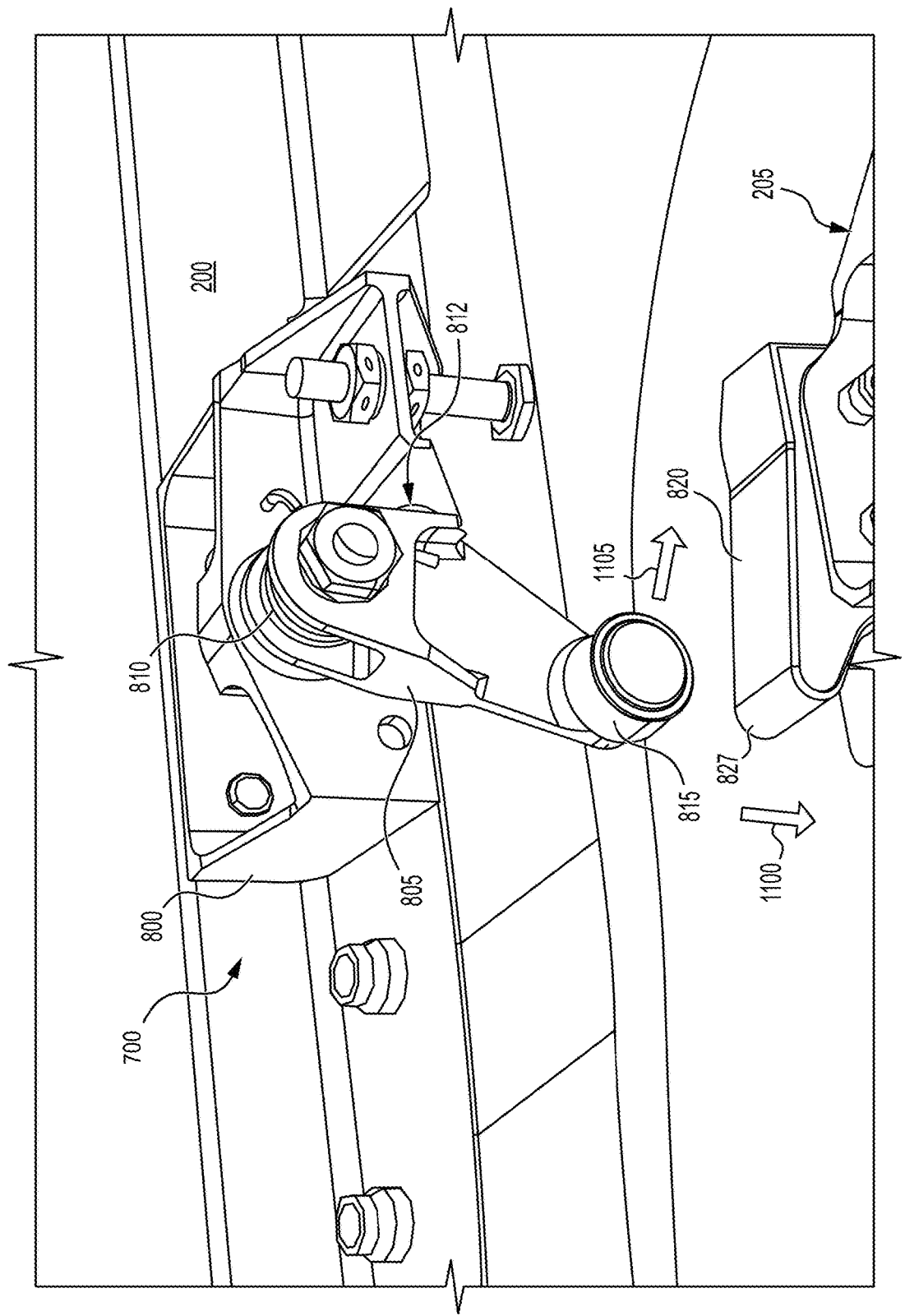
FIG. 11 is a schematic enlarged view of the locking system with the outboard door opened further than shown in FIG. 10, with the roller of the swing arm free from the hook of the outboard door fitting and the swing arm biased back against the swing arm stop.

FIG. 11 is a schematic enlarged view of the locking system with the outboard door opened further than shown in FIG. 10, with the roller of the swing arm free from the hook of the outboard door fitting and the swing arm biased back against the swing arm stop. As shown in FIG. 11, first landing gear bay door 205 is opened further in the direction of a first arrow 1100, proceeding clear of roller 815, thus allowing swing arm 805 to rotate back against swing arm stop 812. This is the condition of the components as the landing gear system continues to deploy.

Figure 12:
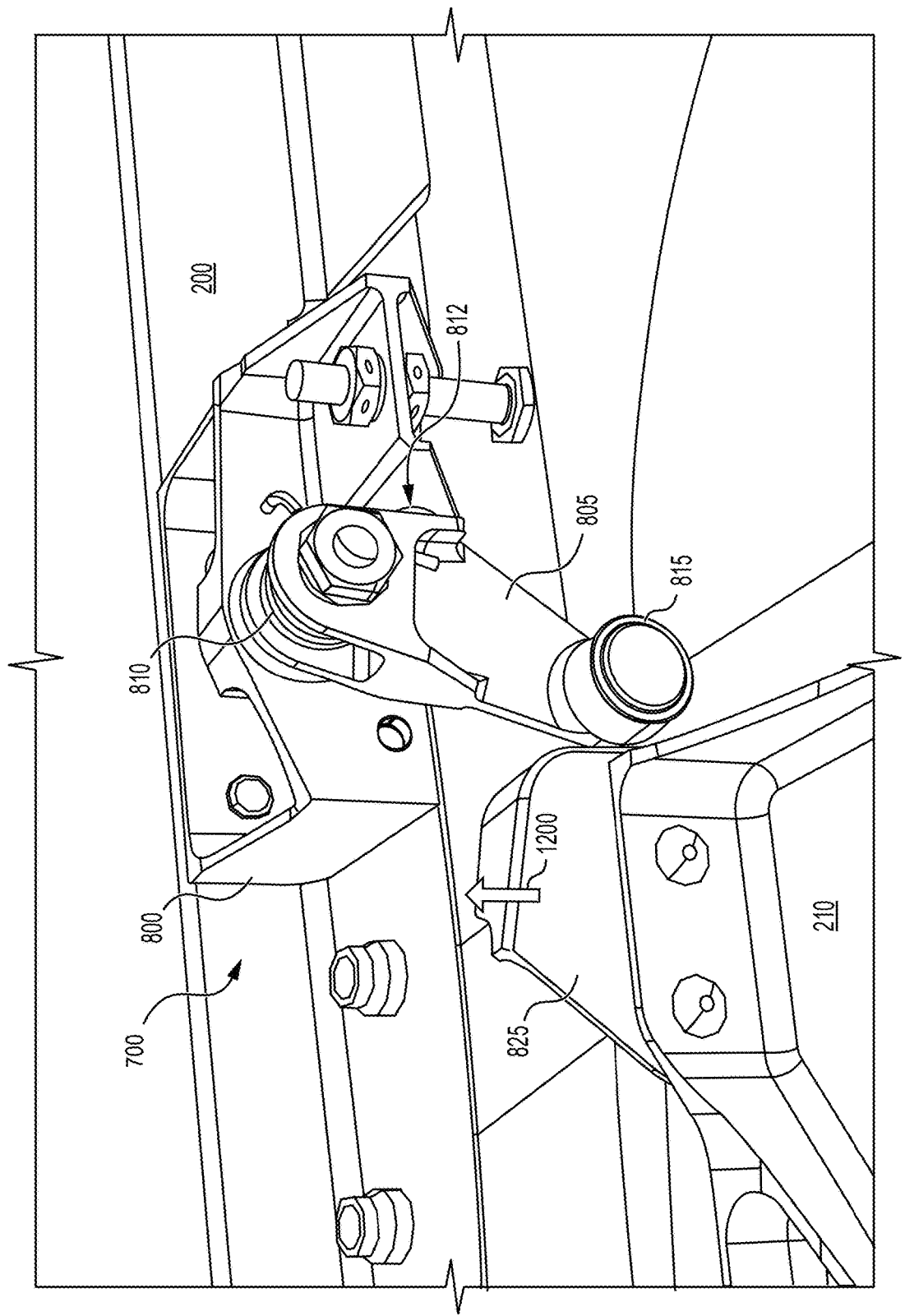
FIG. 12 is a schematic enlarged view of the locking system with the outboard door fully opened and the inboard door fully closed as it would be during takeoff and landing.

FIG. 12 is a schematic enlarged view of the locking system with the outboard door fully opened and the inboard door fully closed as it would be during takeoff and landing. With the landing gear fully deployed, second landing gear bay door 210 closes in the direction of an arrow 1200 as it need not be open once the landing gear is fully deployed. That is, there is clearance for the landing gear assembly with second landing gear bay door 210 open.

Figure 13:
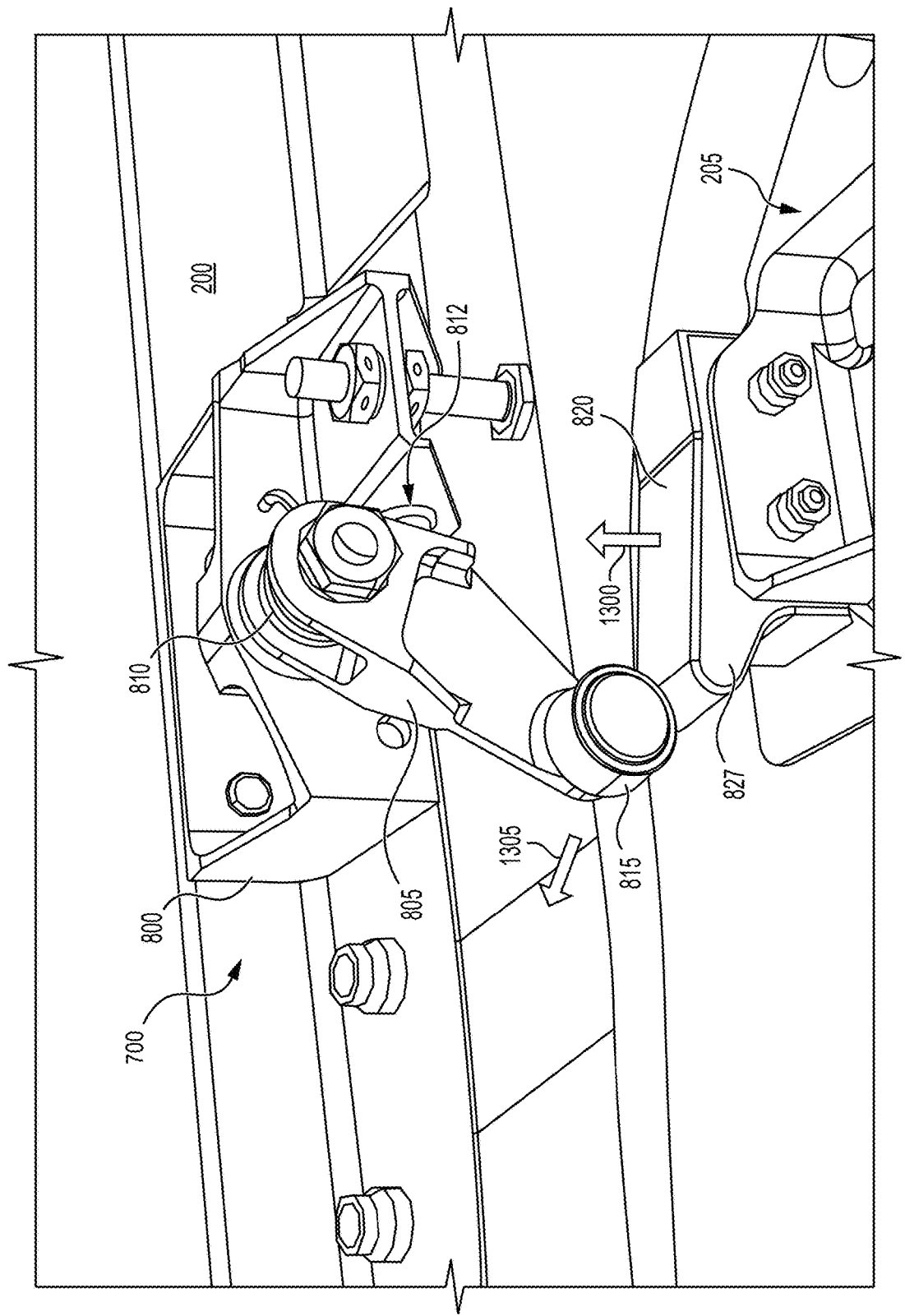
FIG. 13 is a schematic enlarged view of the locking system with the inboard door opened and the outboard door closing and engaging the roller of the swing arm and rotating the swing arm such that the roller is moving in the inboard direction.

When it is time to retract the landing gear, second landing gear bay door 210 opens again, providing clearance for the landing gear assembly to retract and first landing gear bay door 205 to close. FIG. 13 is a schematic enlarged view of the locking system with the inboard door opened and the outboard door closing and engaging the roller of the swing arm and rotating the swing arm such that the roller is moving in the inboard direction. As shown in FIG. 13, first landing gear bay door 205 is closing in the direction of a first arrow 1300, thereby rotating swing arm 805 in the inboard direction, as shown by a second arrow 1305 due to the camming action of hook 827.

Figure 14:
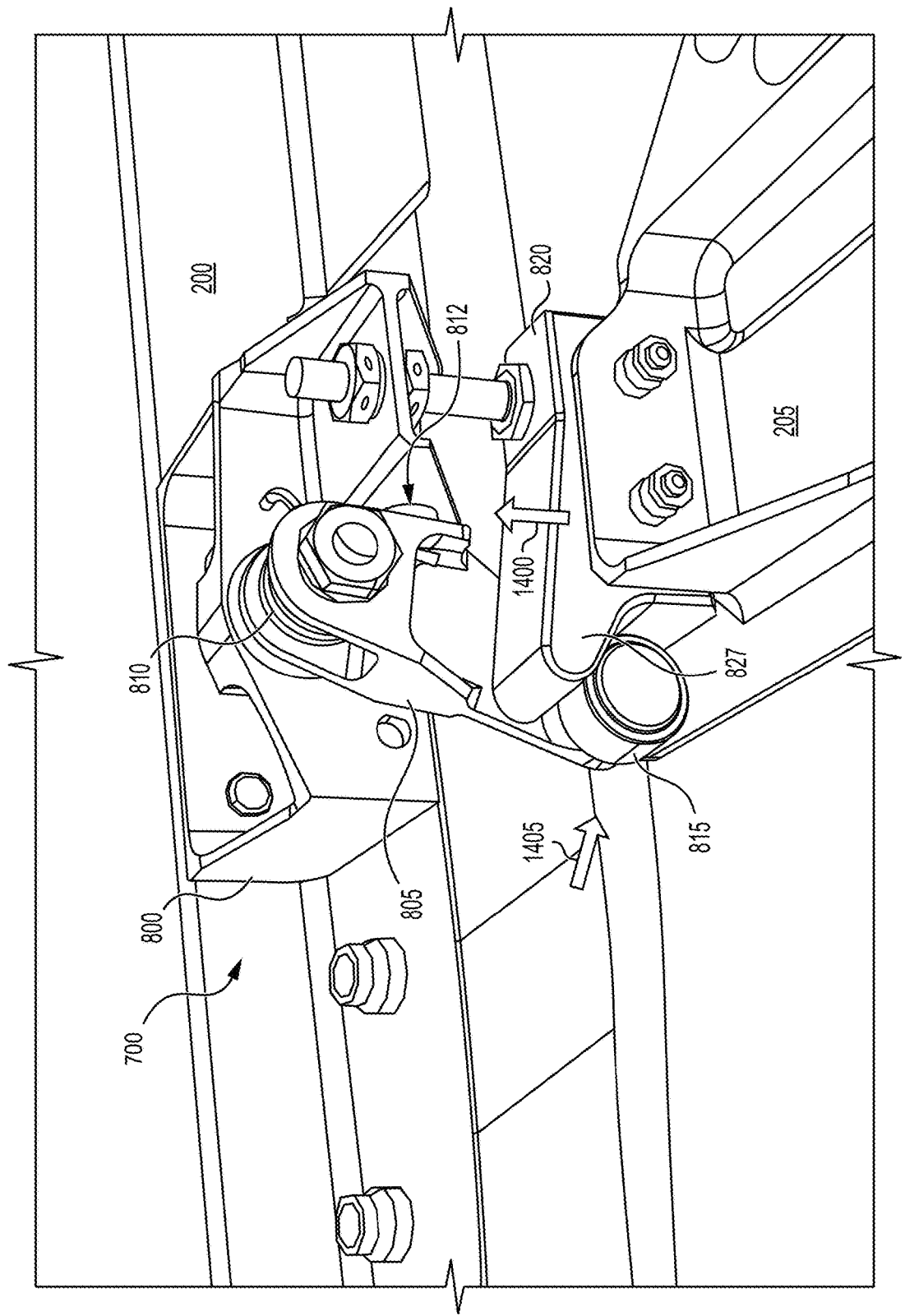
FIG. 14 is a schematic enlarged view of the locking system with the inboard door open and the outboard door moving into the fully closed position and the swing arm moving in the outboard direction to secure the roller under the hook of the outboard door fitting.

As the outboard door closes, roller 815 is allowed to fall back in under hook 827 to secure the outboard door. FIG. 14 is a schematic enlarged view of the locking system with the inboard door open and the outboard door moving into the fully closed position and the swing arm moving in the outboard direction to secure the roller under the hook of the outboard door fitting. As shown in FIG. 14, first landing gear bay door 205 closes in the direction of a first arrow 1400. As hook 827 passes roller 815, swing arm 205 is permitted to rotate back in the direction of a second arrow 1405 (due to spring bias) such that roller 815 falls into place under hook 827, thereby securing first landing gear bay door 205.

Figure 15:
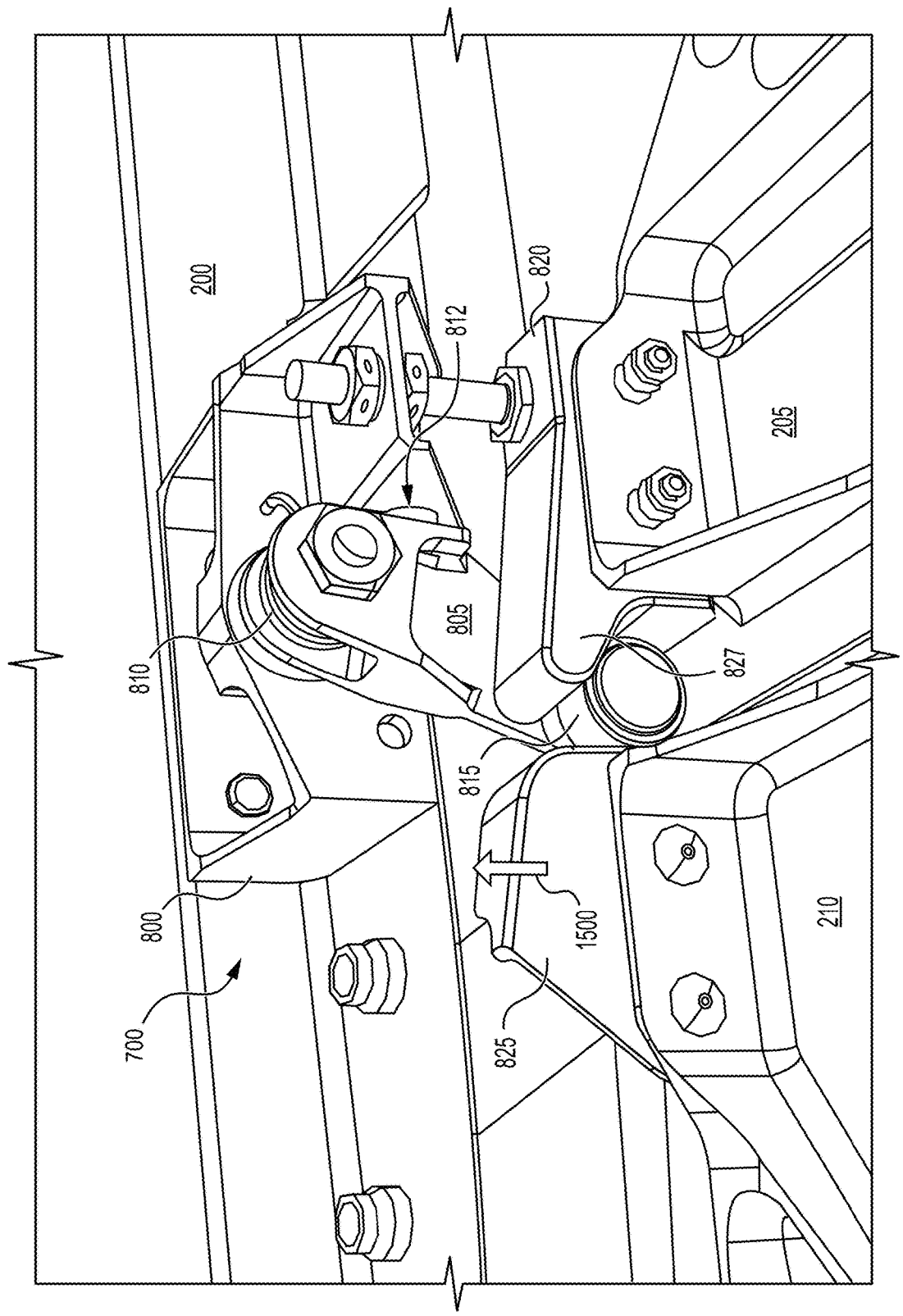
FIG. 15 is a schematic enlarged view of the locking system with the inboard door moved into the fully closed position so both doors are closed as they are when the landing gear is fully retracted.

Once the outboard door is closed and secured, the inboard door closes, thereby further securing the outboard door by preventing rotation of the swing arm. FIG. 15 is a schematic enlarged view of the locking system with the inboard door moved into the fully closed position so both doors are closed as they are when the landing gear is fully retracted. As shown in FIG. 15, second landing gear bay door closes in the direction of an arrow 1500 into the fully closed position. It will be noted that this places the system into the same condition as shown in FIG. 8, with second door fitting 825 preventing roller 815 from moving out from under hook 827. Again, this is the condition of the components with the landing gear fully retracted (i.e., during flight).

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A locking system for doors of a deployable aircraft landing gear system, the locking system comprising:
a spring-biased swing arm configured to be pivotally attached to a body of an aircraft and including a roller at a distal end of the swing arm;
wherein the swing arm is configured to engage with a portion of a first landing gear bay door to prevent the first landing gear bay door from opening;
wherein the portion of the first landing gear bay door is a hook and the roller is configured to engage the first landing gear bay door under the hook, thereby preventing the first landing gear bay door from opening;
wherein the roller of the swing arm is configured to be prevented from disengaging from the portion of the first landing gear bay door by a portion of a second landing gear bay door adjacent to the first landing gear bay door; and
wherein the roller is configured to abut the portion of the second landing gear bay door to prevent the roller from moving out from under the hook of the first landing gear bay door.

2. The locking system of claim 1, wherein the locking system further includes a swing arm support bracket secured to the body of the aircraft; and
wherein the swing arm is pivotally attached to the swing arm support bracket.

3. The locking system of claim 2, further including an adjustable swing arm stop associated with the swing arm support bracket, the adjustable swing arm stop configured to define an unrotated position of the swing arm.

4. The locking system of claim 1, wherein the swing arm is spring-biased by a torsion spring.

5. An aircraft, comprising:
a body;
at least one deployable landing gear configured to be retracted into a landing gear bay within the body of the aircraft;
a first landing gear bay door;
a second landing gear bay door adjacent to the first landing gear bay door; and
a locking system including a spring-biased swing arm pivotally attached to the body of the aircraft and including a roller at a distal end of the swing arm;
wherein the swing arm is configured to engage with a portion of the first landing gear bay door to prevent the first landing gear bay door from opening; and
wherein the portion of the first landing gear bay door is a hook and the roller is configured to engage the first landing gear bay door under the hook, thereby preventing the first landing gear bay door from opening.

6. The aircraft of claim 5, wherein the roller of the swing arm is configured to be prevented from disengaging from the portion of the first landing gear bay door by a portion of the second landing gear bay door.

7. The aircraft of claim 6, wherein the roller is configured to abut the portion of the second landing gear bay door to prevent the roller from moving out from under the hook of the first landing gear bay door.

8. The aircraft of claim 5, wherein the locking system further includes a swing arm support bracket secured to the body of the aircraft; and
wherein the swing arm is pivotally attached to the swing arm support bracket.

9. The aircraft of claim 8, further including an adjustable swing arm stop associated with the swing arm support bracket, the adjustable swing arm stop configured to define an unrotated position of the swing arm.

10. The aircraft of claim 5, wherein the swing arm is spring-biased by a torsion spring.

11. A deployable aircraft landing gear system, the locking system comprising:
a first landing gear bay door;
a second landing gear bay door adjacent to the first landing gear bay door; and
a locking system including a spring-biased swing arm configured to be pivotally attached to a body of an aircraft and including a roller at a distal end of the swing arm;
wherein the swing arm is configured to engage with a portion of the first landing gear bay door to prevent the first landing gear bay door from opening;
wherein the portion of the first landing gear bay door is a hook and the roller is configured to engage the first landing gear bay door under the hook, thereby preventing the first landing gear bay door from opening;
wherein the roller of the swing arm is configured to be prevented from disengaging from the portion of the first landing gear bay door by a portion of the second landing gear bay door;
wherein the roller is configured to abut the portion of the second landing gear bay door to prevent the roller from moving out from under the hook of the first landing gear bay door.

12. The system of claim 11, wherein the locking system further includes a swing arm support bracket secured to the body of the aircraft; and
wherein the swing arm is pivotally attached to the swing arm support bracket.

13. The system of claim 11, wherein the swing arm is spring-biased by a torsion spring.

* * * * *